US006516354B2

United States Patent
Cavanaugh

(10) Patent No.: US 6,516,354 B2
(45) Date of Patent: *Feb. 4, 2003

(54) METHOD AND APPARATUS FOR EFFICIENT REPRESENTATION OF VARIABLE LENGTH IDENTIFIERS IN A DISTRIBUTED OBJECT SYSTEM

(75) Inventor: Ken M. Cavanaugh, Montara, CA (US)

(73) Assignee: Sun Microsystems, Inc., Santa Clara, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/993,204

(22) Filed: Dec. 18, 1997

(65) Prior Publication Data

US 2002/0029297 A1 Mar. 7, 2002

(51) Int. Cl.⁷ .................................................. G06F 9/00
(52) U.S. Cl. ........................ 709/316; 709/315; 709/219; 707/103 R
(58) Field of Search .................... 395/705; 709/303, 709/315, 316, 203, 200, 219; 707/103 R

(56) References Cited

U.S. PATENT DOCUMENTS

| 4,823,310 A | 4/1989 | Grand |
| 5,218,699 A | 6/1993 | Brandle et al. |
| 5,263,160 A | 11/1993 | Porter, Jr. et al. |
| 5,307,490 A | 4/1994 | Davidson et al. |
| 5,341,478 A | 8/1994 | Travis, Jr. et al. |
| 5,455,951 A | 10/1995 | Bolton et al. |
| 5,475,845 A | 12/1995 | Orton et al. |
| 5,481,706 A | 1/1996 | Peek |
| 5,491,800 A | 2/1996 | Goldsmith et al. |
| 5,493,680 A | 2/1996 | Danforth |
| 5,515,508 A | 5/1996 | Pettus et al. |
| 5,540,014 A | 7/1996 | Smith |
| 5,566,302 A | 10/1996 | Khalidi et al. |
| 5,577,251 A | 11/1996 | Hamilton et al. |
| 5,581,680 A | * 12/1996 | Sfarti et al. .................. 345/443 |
| 5,581,765 A | * 12/1996 | Munroe et al. ............. 709/107 |
| 5,682,534 A | 10/1997 | Kapoor et al. |
| 5,692,157 A | 11/1997 | Williams |
| 5,724,503 A | 3/1998 | Kleinman et al. |
| 5,727,145 A | 3/1998 | Nessett et al. |
| 5,734,903 A | 3/1998 | Saulpaugh et al. |
| 5,737,607 A | 4/1998 | Hamilton et al. |
| 5,740,355 A | 4/1998 | Watanabe et al. |

(List continued on next page.)

FOREIGN PATENT DOCUMENTS

EP          0643349 A1     3/1995

OTHER PUBLICATIONS

Roger S. Chin et al., "Distributed Object–Based Programming Systems", Mar. 1991.*

(List continued on next page.)

*Primary Examiner*—St. John Courtenay, III
*Assistant Examiner*—Lewis A. Bullock, Jr.
(74) *Attorney, Agent, or Firm*—Kudirka & Jobse, LLP

(57) ABSTRACT

In a CORBA distributed object system, potential object name ambiguities in the Portable Object Adapter are resolved without using variable-length object identifiers by translating the variable length identifiers into a fixed length compact identifier, such as a integer. The mapping for persistent objects is maintained on an ID server with persistent state and the mappings are ultimately written to a file. A server IDL interface is defined to the ID server which interface includes a method that accepts a variable length fully qualified name and returns the compact identifier. The method assigns an identifier if one does not exist. Another method accepts the identifier and returns the name.

21 Claims, 9 Drawing Sheets

U.S. PATENT DOCUMENTS

| | | | | |
|---|---|---|---|---|
| 5,748,963 A | * | 5/1998 | Orr | 717/131 |
| 5,751,962 A | * | 5/1998 | Fanshier et al. | 709/223 |
| 5,758,342 A | | 5/1998 | Gregerson | |
| 5,761,670 A | | 6/1998 | Joy | |
| 5,787,251 A | | 7/1998 | Hamilton et al. | |
| 5,787,447 A | | 7/1998 | Smithline et al. | |
| 5,790,848 A | | 8/1998 | Wlaschin | |
| 5,793,965 A | | 8/1998 | Vanderbilt et al. | |
| 5,809,507 A | | 9/1998 | Cavanaugh, III | |
| 5,812,768 A | * | 9/1998 | Page et al. | 709/217 |
| 5,815,703 A | | 9/1998 | Copeland et al. | |
| 5,819,093 A | | 10/1998 | Davidson et al. | |
| 5,832,487 A | * | 11/1998 | Olds et al. | 707/10 |
| 5,835,906 A | | 11/1998 | Hagersten et al. | |
| 5,848,236 A | | 12/1998 | Dearth et al. | |
| 5,852,731 A | | 12/1998 | Wang et al. | |
| 5,862,376 A | | 1/1999 | Steele, Jr. et al. | |
| 5,864,866 A | * | 1/1999 | Henckel et al. | 707/103 R |
| 5,870,753 A | * | 2/1999 | Chang et al. | 707/10 |
| 5,870,805 A | | 2/1999 | Bracho et al. | |
| 5,873,116 A | | 2/1999 | Van Fleet | |
| 5,881,315 A | | 3/1999 | Cohen | |
| 5,892,946 A | * | 4/1999 | Woster et al. | 709/316 |
| 5,893,118 A | | 4/1999 | Sonderegger | |
| 5,907,675 A | | 5/1999 | Aahlad | |
| 5,913,038 A | | 6/1999 | Griffiths | |
| 5,915,252 A | | 6/1999 | Misheski et al. | |
| 5,926,775 A | | 7/1999 | Brumley et al. | |
| 5,928,323 A | | 7/1999 | Gosling et al. | |
| 5,933,605 A | | 8/1999 | Kawano et al. | |
| 5,946,680 A | * | 8/1999 | Shorter et al. | 707/3 |
| 5,953,530 A | | 9/1999 | Rishi et al. | |
| 5,958,006 A | | 9/1999 | Eggleston et al. | |
| 5,974,410 A | | 10/1999 | Copeland et al. | |
| 5,978,940 A | | 11/1999 | Newman et al. | |
| 5,991,823 A | | 11/1999 | Cavanaugh, III et al. | |
| 6,016,499 A | * | 1/2000 | Ferguson | 707/104.1 |
| 6,044,409 A | | 3/2000 | Lim et al. | |
| 6,101,569 A | | 8/2000 | Miyamoto et al. | |
| 6,128,640 A | | 10/2000 | Kleinman | |
| 6,189,048 B1 | | 2/2002 | Lim et al. | |
| 6,405,246 B1 | * | 6/2002 | Hutchison | 709/203 |

OTHER PUBLICATIONS (BULL) Groupe Bull et al. "Joint Object Services Submission—Life Cycle and Association Services Specification", Feb. 1993.*

OMG. Chapter 24, "Coding the Depot: Overview and C Language Coding" p. 411–450. 1995.*

Sun Microsystems. "Using CORBA and JAVA IDL" p. 1–5, 1996–98.*

Schmidt, Douglas C. et al. "Object Interconnections" Oct. 1997, p. 1–9.*

Reverbel, Francisco C. R. et al. "Making CORBA Objects Persistent: the Object Database Adapter Approach" Jun. 1997. USENIX.*

Silva, Antonio Rito et al. "Distributed Proxy: A Design Pattern for Distributed Object Communication", Sep. 1997.*

Sun. Portable Object Adapter. 2002.*

Pyarali, Irfan et al. "An Overview of the CORBA Portable Object Adapter". 1998.*

Kleindienst, Jan et al. "Lessons Learned from Implementing the CORBA Persistent Object Service". ACM 1996.*

OMG Security Specification Document Formal/Nov. 5, 1997, pp. 15–9 to 15–10; pp. 15–147 to 15–162 (Section 15–7); pp. 15–219 to 15–230 (appendix B–6 to B–9.3) OMG Website—*www.omg.org*.

The Orbix 2 Reference Guide, Release 2.0 Nov. 1995, pp. 197–209; The Orbix 2 Programming Guide, Release 2.0 Nov. 1995, pp. 143, pp. 189–196, pp. 303–304—*Support@iona.com*.

Evaluations, Orbix (IONA), pp 1–2—*http://www.c3.lanl.gov/village/dist–comp/section2_5_2.html*.

Orbix, Market–Leading Implementation of CORBA 2, pp. 1–3—*http://www.blackwhite.com/products/orbix.html*.

IONA Technologies, IONA Delivers Full Suite of Features for Orbix 2.1, pp. 1–2—*http://www.iona.com/news/press-room/Orbix21/Features.html*.

Iona Technologies, Apr. 1994, Version 1.2.1 Release Notes, pp. 1–4—*http://www.up.ac.za/hsn/docs/orbix/RelNotes12.txt*.

IONA Technologies, Orbix C+++ Version(s) : All, pp. 1—*http://www–usa.iona.com/support/kb/Orbix_C++/articles/324.805.html*.

IONA Technologies, Orbix C++ Version(s) :2.x, pp. 1—*http://www–usa.iona.com/support/kb/Orbix_C++/articles/238.214.html*.

IONA Technologies, Orbix C++ Version(s) : 2.x, pp. 1–2—*http://www–usa.iona.com/support/kb/Orbix_C++/articles/239.540.html*.

IONA Technologies, Orbix C++ Version(s) : All, pp. 1–2—*http://www–usa.iona.com/support/kb/Orbix_C++/articles/351.196.html*.

IONA Technologies, Orbix C++ Version(s) : All, pp. 1–2—*http://www–usa.iona.com/support/kb/Orbix_C++/articles/352.291.html*.

Silicon Graphics, "Iterators", http://www.rt.e–technik.tu-darmstadt.de/~mali/DOC/STL_doc/iterators.html, pp. 1–3.

IBM Technical Disclosure Bulletin, "Remote Procedure Call Stud Size Reduction Technique—a Combining Parameter Code", vol. 36, No. 09B, Sep., 1993, pp. 351–352.

IBM Technical Disclosure Bulletin, "Callos2w XP 000587433" vol. 39, No. 04, Apr. 1996, pp. 91–96.

IBM's SOMobjects Developer Toolkit, Users Guide, "An Introductory Guide to the System Object Model and Its Accompanying Frameworks", Version 2.0, Jun., 1993.

Object Management Group, "The Common Object Request Broker: Architecture and Specification" Revision 2.0, Jul., 1995.

Hamilton, Graham, et al., "Subcontract: A Flexible Base for Distributed Programming", Apr., 1993.

Shapiro, Marc, "A Binding Protocol For Distributed Shared Objects", IEEE, 1994, pp. 134–141.

Bhoedjang, R.A.F., et al., "Friendly and Efficient Message Handling", IEEE, 1996, pp. 121–130.

* cited by examiner

METHOD AND APPARATUS FOR EFFICIENT REPRESENTATION OF VARIABLE LENGTH IDENTIFIERS IN A DISTRIBUTED OBJECT SYSTEM

CROSS REFERENCE TO RELATED APPLICATIONS

The following U.S. patent applications are related to the present application and are incorporated by reference herein in their entirety:

U.S. patent application Ser. No. 08/554,794, filed Nov. 7, 1995 as a continuation to U.S. patent application Ser. No. 07/995,863, filed Dec. 21, 1992 (now abandoned);

U.S. patent application Ser. No. 08/670,682, filed Jun. 26, 1996;

U.S. patent application Ser. No. 08/673,181, filed Jun. 26, 1996;

U.S. patent application Ser. No. 08/670,681, filed Jun. 26, 1996;

U.S. patent application Ser. No. 08/670,684, filed Jun. 26, 1996;

U.S. patent application Ser. No. 08/669,782, filed Jun. 26, 1996;

U.S. patent application Ser. No. 08/993,075 entitled "Method and Apparatus for Deferred Throwing of Exceptions in C++", filed by Christian J. Callsen and Ken M. Cavanaugh, and filed on an even date herewith;

U.S. patent application Ser. No. 08/993,800 entitled "Method and Apparatus for Fast, Local CORBA Object References", filed by Christian J. Callsen and Ken M. Cavanaugh, and filed on an even date herewith;

U.S. patent application Ser. No. 08/993,205 entitled "Method and Apparatus for Constructing Stable Iterators in a Shared Data Collection", filed by Christian J. Callsen and Ken M. Cavanaugh, and filed on an even date herewith;

U.S. patent application Ser. No. 08/993,206 entitled, "Method and Apparatus for Enforcing Locking Invariants in Multi-Threaded Systems", filed by Christian J. Callsen and Ken M. Cavanaugh, and filed on an even date herewith;

U.S. patent application Ser. No. 08/993,287 entitled, "Filter Framework for Executing Code During Method Invocation", filed by Anita Jindal, Ken M. Cavanaugh, Sanjeev Krishnan and Rohit Garg, and filed on an even date herewith; and U.S. patent application Ser. No. 08/993,263 entitled, "Marshaling And Unmarshaling Framework For Supporting Filters In A Distributed Object System", filed by Anita Jindal, Ken M. Cavanaugh and Sanjeev Krishnan, and filed on an even date herewith.

FIELD OF THE INVENTION

This invention relates to distributed object systems using common object request broker architecture (CORBA) and, more particularly, to a method and apparatus for implementing group object identification in object adapters.

BACKGROUND OF THE INVENTION

Software programs are continually becoming more complicated. Early programs consisted of straightforward procedural code that presented a simple, command line interface and text display to the user. These simple programs have gradually been replaced with complex programs that have graphical user interfaces and multiple features.

As programs have grown in complexity, the amount of effort which is required to write and debug the programs has also increased drastically. Consequently, major efforts have been made to reduce the amount of programming necessary to produce a modern, full-featured product. One of the most successful of these efforts has been the development of object-oriented programming in which programs are designed as collections of discrete elements called "objects". The objects can be modified and reused in many cases, thereby reducing the development effort.

As will be understood by those skilled in the art, objects in the context of object-oriented programming are software entities comprising data and methods or operations on that data. The methods of an object collectively form an interface for manipulating the data in the object. The objects exist only at program runtime and are created, or instantiated, from object "classes" which are actually written by the programmer. The class code written by a programmer can be "reused" by another programmer by instantiating objects from that code.

In order to further reduce the programming burden, distributed object systems have been developed in which methods in objects resident on a server can be executed or invoked remotely over a network from a client application. In this manner, the objects can be developed and maintained by a party different from the party that developed the client application. In such a system information is routed or streamed between the client and the server. This information includes requests from the client to invoke an object on the server and results and data from the method invocation returning from the server to the client. In addition, object-oriented programs often communicate by streaming objects from one program to another.

In such streaming operations, a stream writer organizes, or marshals, the information to form a serial data stream. The serial data stream is then sent to the server where a stream reader unmarshals, the serial data stream to reconstruct a copy of the original information. The stream reader must operate such that the unmarshaling exactly "undoes" the effect of the marshaling so that the original information can be reconstructed. Ordinarily, such an operation does not present a problem, but when the stream reader is not written by the same author as the stream writer there can be incompatibilities.

In order to standardize the marshaling and unmarshaling and data transfer process, an industry consortium called the Object Management Group (OMG) was formed whose mission is to define a set of interfaces for inter-operable software. Its first specification, the Common Object Request Broker Architecture (CORBA) specification, is an industry consensus standard that hides all differences between programming languages, operating systems, and object location. The CORBA standard defines an object request broker (ORB) that handles the marshaling, transport and unmarshaling of information between applications. The ORB functions as a communication infrastructure, transparently relaying object requests across distributed heterogeneous computing environments. Inter-operability is accomplished through well-defined object interface specifications which allow client applications to connect to the ORB. CORBA provides an implementation independent notation for defining interfaces called the OMG Interface Definition Language (IDL).

The OMG CORBA specification defines an implementation independent object model which is actually built with a programming language, such as C++ or Java. In this model CORBA objects (also called "servants"), which are implemented by servers, have references that can be exported to clients. Clients and servers are roles, not mutually exclusive tasks for a single program, so that any one program can be both a client and a server. Objects and object references are typically different programming language objects, although they do not have to be.

In a server, the implementation of an actual object which can be used to satisfy an invocation on a CORBA object is generally both platform and language dependent and various models are possible for implementing objects in servers. The original CORBA standard defined a Basic Object Adapter (or BOA) which is a framework that adapts the server implementation to the implementation independent ORB. A newer OMG portability standard defines a Portable Object adapter (or POA), which replaces the BOA and is intended to be platform independent. Many ORBs also support other proprietary frameworks for implementing CORBA objects. All of these frameworks are commonly referred to as Object Adapters (or OAs).

One common feature shared by many OAs is that the various policies that they control may extend over collections of related objects. Illustratively, the aforementioned POA specification defines an object known as a PortableServer::POA which acts as a grouping of CORBA objects. There are many reasons for such groupings. For example, a certain group of objects may share the same mechanism for associating a servant with a CORBA object for a particular invocation. Therefore, there is a need for identifying all objects in the same grouping based on information stored in the object reference.

There may be many PortableServer::POA objects defined within a CORBA server and each of these objects has a name. These objects are also arranged in a hierarchy, with a root PortableServer::POA object defined by the POA. The names of individual POA objects are only unique within the collection of PortableServer::POA objects that share the same parent. For example, the following hierarchy defines a legal collection of PortableServer::POA objects in a CORBA server:

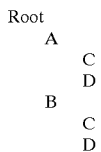

As illustrated, the C and D named objects are only unique within their respective A and B groups. In order to fully identify a particular PortableServer::POA object, the sequence of all names starting with the root is needed. For example, the following could be fully qualified POA names (note that the CORBA standard does not define a syntax for POA names):

Root/A/C

Root/B/C

Some data that identifies a particular instance of the PortableServer::POA class must be present in a CORBA object reference for a POA object so that the server can dispatch requests directed to the referenced object to the correct instance of the PortableServer::POA class. One method of identifying objects is to use a text string representing the name of the PortableServer::POA instance concatenated with the names of all of its ancestors. Such a string would uniquely identify each instance, but it has a variable length depending on the number of ancestors. These variable length identifiers would greatly slow the object invocation process due to the decoding time, especially when a very fast transport is used.

Therefore, it would be desirable to use a unique POA identifier which can be decoded rapidly to reduce object invocation time.

SUMMARY OF THE INVENTION

In accordance with the principles of the invention, the variable length object identifiers are translated into a fixed length compact identifier, such as a integer. The mapping for persistent objects is maintained on a server with persistent state and the mappings are ultimately written to a file.

More specifically, a new server IDL interface is defined which includes a method that accepts a fully qualified name and returns the compact identifier. The method assigns an identifier if one does not exist. Another method accepts the identifier and returns the name.

The server maintains the name-identifier mapping until it is destroyed using conventional API routines for removing servers.

BRIEF DESCRIPTION OF THE DRAWINGS

The above and further advantages of the invention may be better understood by referring to the following description in conjunction with the accompanying drawings in which.

DETAILED DESCRIPTION OF THE PREFERRED EMBODIMENT

Figure 1:
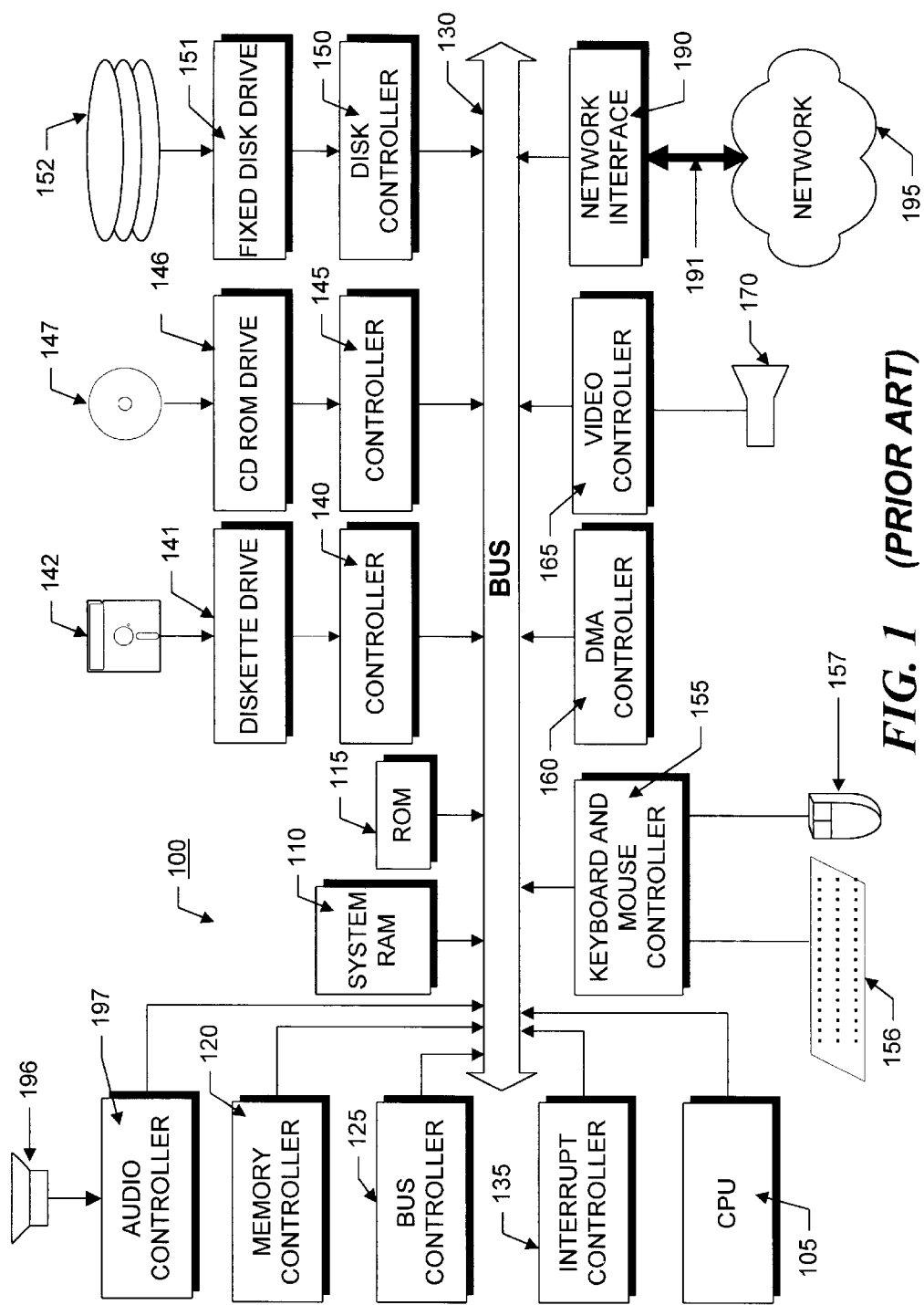
FIG. 1 is a schematic block diagram of an illustrative prior art hardware platform which forms part of a computer system on which the invention can be run.

FIG. 1 illustrates the system architecture for an exemplary client computer 100, such as an IBM THINKPAD 701® computer or Digital Equipment Corporation HiNote™ computer, on which the disclosed network access system (system) can be implemented. The exemplary computer system of FIG. 1 is discussed only for descriptive purposes, however, and should not be considered a limitation of the invention. Although the description below may refer to terms commonly used in describing particular computer systems, the described concepts apply equally to other computer systems, including systems having architectures that are dissimilar to that shown in FIG. 1.

The client computer 100 includes a central processing unit (CPU) 105, which may include a conventional microprocessor, random access memory (RAM) 110 for temporary storage of information, and read only memory (ROM) 115 for permanent storage of information. A memory controller 120 is provided for controlling system RAM 110. A bus controller 125 is provided for controlling bus 130, and an interrupt controller 135 is used for receiving and processing various interrupt signals from the other system components.

Mass storage may be provided by diskette 142, CD-ROM 147, or hard disk 152. Data and software may be exchanged with client computer 100 via removable media, such as diskette 142 and CD-ROM 147. Diskette 142 is insertable into diskette drive 141, which is connected to bus 130 by controller 140. Similarly, CD-ROM 147 is insertable into CD-ROM drive 146, which is connected to bus 130 by controller 145. Finally, the hard disk 152 is part of a fixed disk drive 151, which is connected to bus 130 by controller 150.

User input to the client computer 100 may be provided by a number of devices. For example, a keyboard 156 and a mouse 157 may be connected to bus 130 by keyboard and mouse controller 155. An audio transducer 196, which may act as both a microphone and a speaker, is connected to bus 130 by audio controller 197. It should be obvious to those reasonably skilled in the art that other input devices, such as a pen and/or tablet and a microphone for voice input, may be connected to client computer 100 through bus 130 and an appropriate controller. DMA controller 160 is provided for performing direct memory access to system RAM 110. A visual display is generated by a video controller 165, which controls video display 170.

Client computer 100 also includes a network adapter 190 that allows the client computer 100 to be interconnected to a network 195 via a bus 191. The network 195, which may be a local area network (LAN), a wide area network (WAN), or the Internet, may utilize general purpose communication lines that interconnect multiple network devices.

Client computer system 100 generally is controlled and coordinated by operating system software, such as the WINDOWS 95® operating system (available from Microsoft Corp., Redmond, Wash.). Among other computer system control functions, the operating system controls allocation of system resources and performs tasks such as process scheduling, memory management, networking and I/O services.

Figure 2:
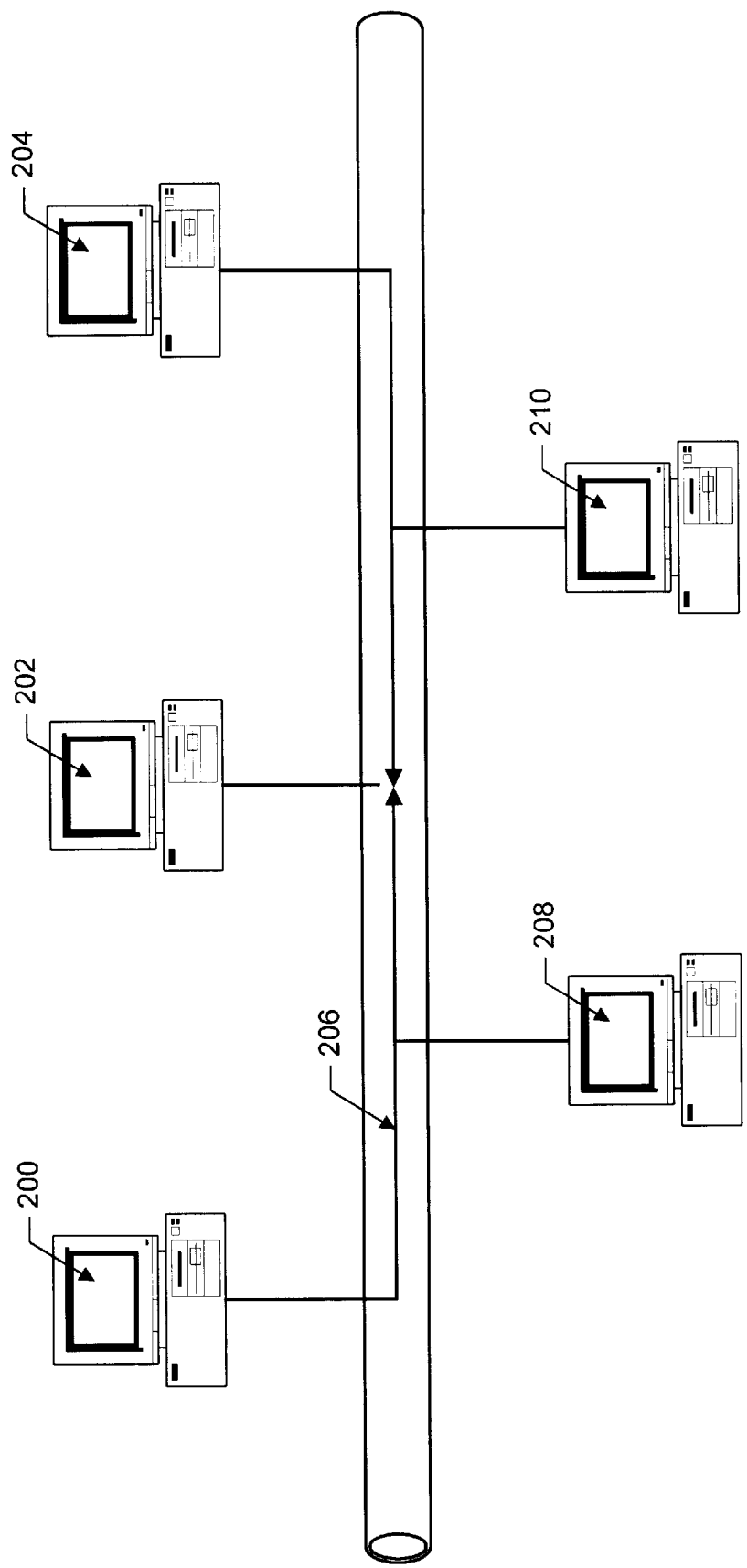
FIG. 2 is a schematic diagram of a prior art computer network system on which a CORBA system can be built.

FIG. 2 illustrates, in a very simple fashion, the connection of a number of computing systems, such as that shown in FIG. 1, to form a distributed computing facility. Each of the individual stations 200, 202, 204, 208 and 210 are interconnected by a network mechanism. Although the distributing computing facility could exist on a single computing system, it is more likely to operate over a network transport medium. Such a transport medium may be LAN as shown in FIG. 2, but may also be other network arrangements, including the Internet. All that is necessary is that the terminals 200, 202, 204, 208 and 210 be able to communicate with each other using predefined protocols to exchange information. As previously mentioned, the CORBA architecture overlays such a network and relieves the individual applications from dealing with the details of transporting information over the network. More particularly, the CORBA architecture hides all of the details and the actual network protocols from the application programs. It assures that the application programs operate with each other regardless of the platforms on which the software is designed to run and regardless of the network protocols used to interconnect separate computing systems.

Figure 3:
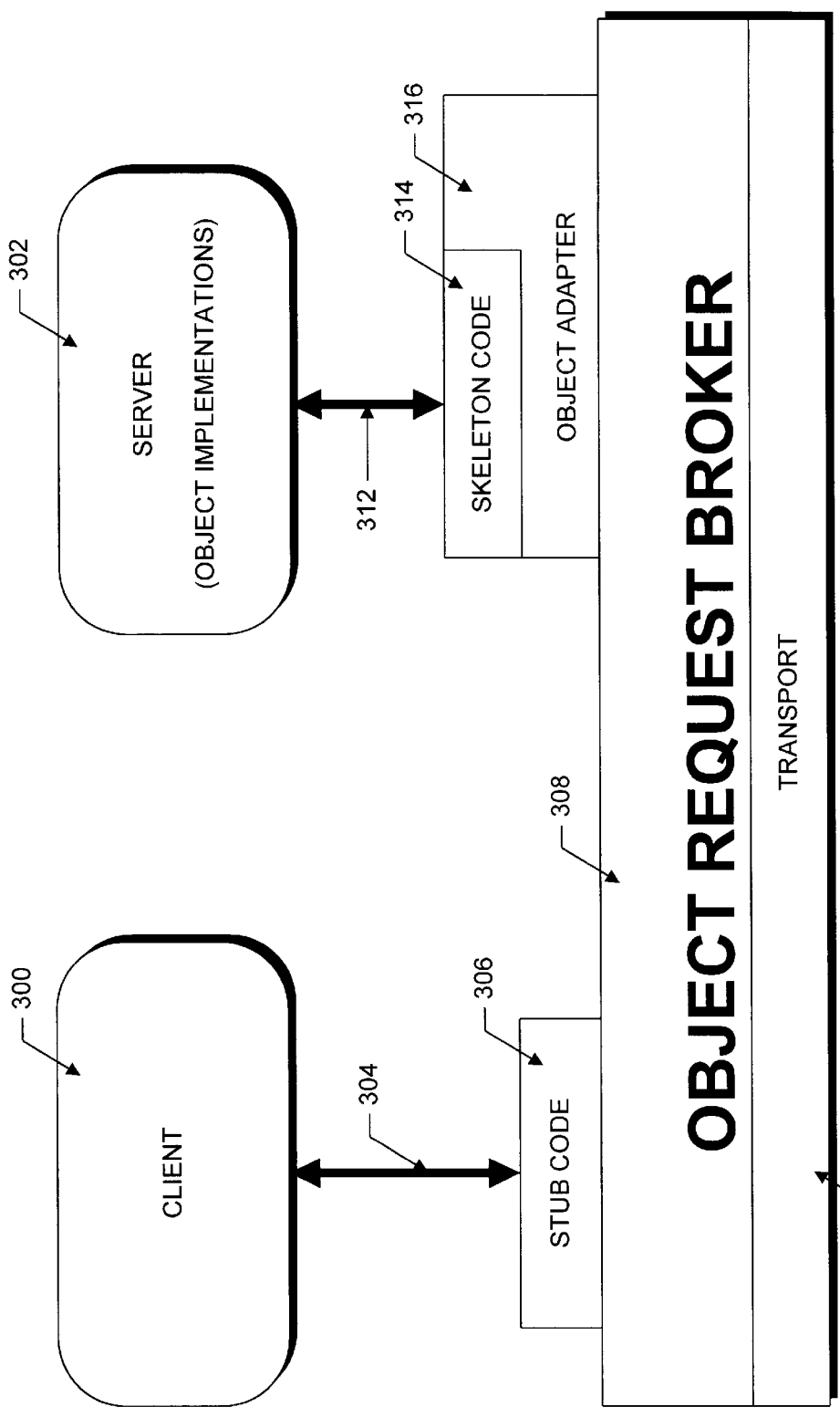
FIG. 3 is a block schematic diagram illustrating a prior art CORBA environment and showing the relationship of the client, ORB, object adapter and server.

FIG. 3 illustrates, in a very schematic form, the basic CORBA architecture which defines a peer-to-peer distributed computing facility where all applications are objects (in the sense of object orientation). Objects can alternate between client roles 300 and server roles 302. An object operates in a client role 300 when it is the originator of an object invocation. An object operates in a server role 302, called an object implementation, when it is the recipient of an object invocation.

The client 300 communicates with the server 302 by means of an object request broker or ORB 308. The ORB 308 operates with a transport 310 that conveys information between the client 300 and server 302 and, as previously mentioned, the ORB 308 handles the marshaling, transport and unmarshaling of information between client 300 and server 302. The client 300 communicates with the ORB 308, as indicated schematically by arrow 304, by means of an implementation independent syntax which describes object encapsulations. This syntax is called an interface definition language (IDL) and is defined in the CORBA specification generated by OMG. The OMG interface definition language can be used to define interfaces that have attributes and operation signatures. The language also supports inheritance between interface descriptions in order to facilitate reuse by developers. Objects or servants in the server 302 export object references with interfaces specified by the OMG IDL for use by clients. The object reference contains an identification of the object implementation so that the server 302 can pass a request to the correct object.

The entire CORBA architecture is actually implemented in a conventional programming language, such as C, C++, or Smalltalk. Implementations in a variety of languages are available from a number of vendors who typically provide a compiler bundled with their ORB products. The compilers generate header files which define the OMG IDL interfaces and can be incorporated into application programs. The compilers also generate stub code 306 and skeleton code 314 for each interface.

The client application program 300 can directly link directly to the OMG IDL stub code 306. As far as the client application program is concerned, an invocation of the stub code 306 appears to be a local function call. Once invoked, the stub code 306 provides an interface to the ORB 308 that performs marshaling to encode and decode the operation parameters into communication formats suitable for transmission on the transport 310 to the server 302.

At the server side, the OMG IDL skeleton code 314 is the corresponding implementation of the OMG IDL interface. When the ORB 308 receives a request, the skeleton code 314 unmarshals the request parameters and generates a call, indicated schematically by arrow 312, to an object implementation in the server 302. When the server completes processing of the request, the skeleton code 314 and stub code 306 return the results to the client program 300. If an error has occurred, exception information generated by the server or by the ORB is returned.

An object adapter 316 comprises the interface between the ORB 308, the skeleton code 314 and the server 302. Object adapters, such as adapter 316, support functions, such as registration of object implementations and activation of servers. There are many potential types of object adapters, depending on the purpose of the adapter. The original CORBA specification defined only a general-purpose Basic Object Adapter or BOA. The BOA performs some basic functions. For example, when a client request specifies an inactive server process, the BOA automatically activates the server process. When the server is activated it registers its implementation with the BOA. The BOA then stores this registration to use in future object requests. After an object is activated, it can receive client requests by means of a callback method in the skeleton code 314. BOA services also include exception handling and object reference management.

Figure 4:
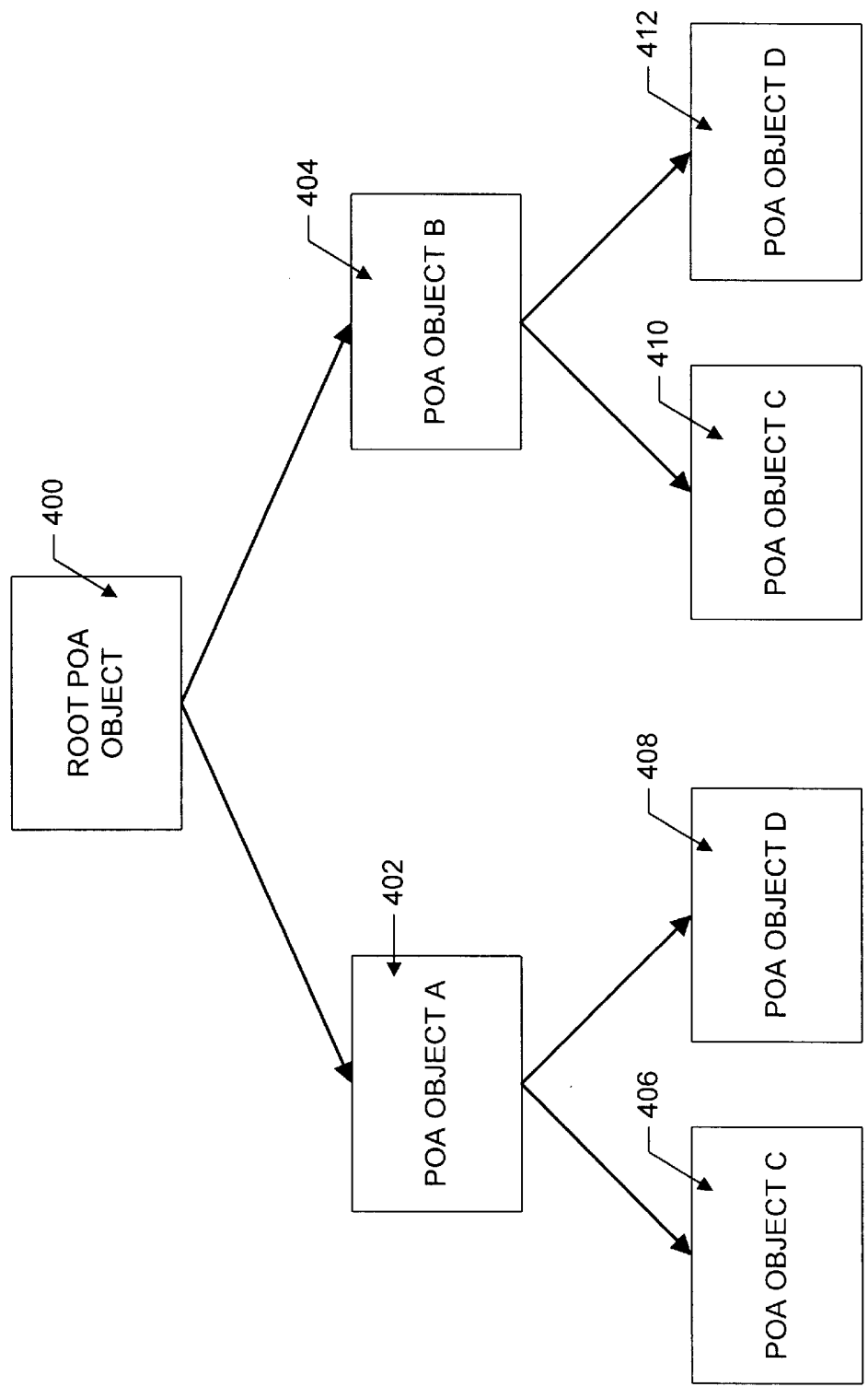
FIG. 4 is a diagram of a POA name hierarchy illustrating groups containing objects with the same name.

More recently, a Portable Object Adapter (POA) has been defined which is intended to be platform-independent. It provides similar services to the BOA. Illustratively, the POA includes objects known as a PortableServer::POA objects which are instances of a PortableServer::POA class. Each of the PortableServer::POA objects is named and the naming scheme is hierarchical. For example, the PortableServer::POA object names could be arranged in a hierarchy such as that shown in FIG. 4.

The apex of the hierarchy is a root object 400 that has a name specified by the POA definition. Illustratively there are two group objects, PortableServer::POA object A (402) and PortableServer::POA object B (404). Each of the group objects 402 and 404 have sub-objects with the same names. For example, object 402 has two objects, PortableServer::POA object C (406) and PortableServer::POA object D (408). Similarly, object 404 has two objects, PortableServer::POA object C (410) and PortableServer::POA object D (412). As previously mentioned, one way to make the names unique is to name each object by its own name concatenated with those of its parents and grandparents. This naming scheme results in names of varying length which greatly slows the decoding time.

In order to be able to uniquely distinguish between object 406 and 410 without naming each object by its own name concatenated with those of its parents and grandparents, each object is assigned a compact "identifier". Such an identifier could illustratively have a fixed length so that decoding time is minimized. For example, a 32-bit unsigned integer can be used as a POA identifier (POA ID).

Each POA object name can then be mapped to a unique POA ID. There are two cases to consider: either the POA is transient, or it is persistent. A transient POA is one that "forgets" all of its object references whenever the server process containing the POA is restarted. In this case, the POA name to POA ID mapping need only guarantee that different POA names map to different POA IDs. Subsequent server incarnations may use a different mapping. For example, if Root/A/C and Root/B/C are both transient POAs, the first incarnation of the server could use the POA name to POA ID mapping:

Root/A/C→1
Root/B/C→2 and the next incarnation could use

Root/A/C→2
Root/B/C→5

However, if the POA is persistent, it must support CORBA objects that persist across multiple incarnations of the same server. Since the contents of a CORBA object reference is fixed when the object reference is created, all identifiers referenced by the object reference must remain fixed across multiple server incarnations. For example, if Root/A/D and Root/B/D are both persistent POAs, and one incarnation of the server uses the POA name to POA ID mapping:

Root/A/D→10
Root/B/D→11 then all future incarnations of the server must use the same mapping. Therefore, some mechanism must be used to make the mapping persistent.

Figure 5:
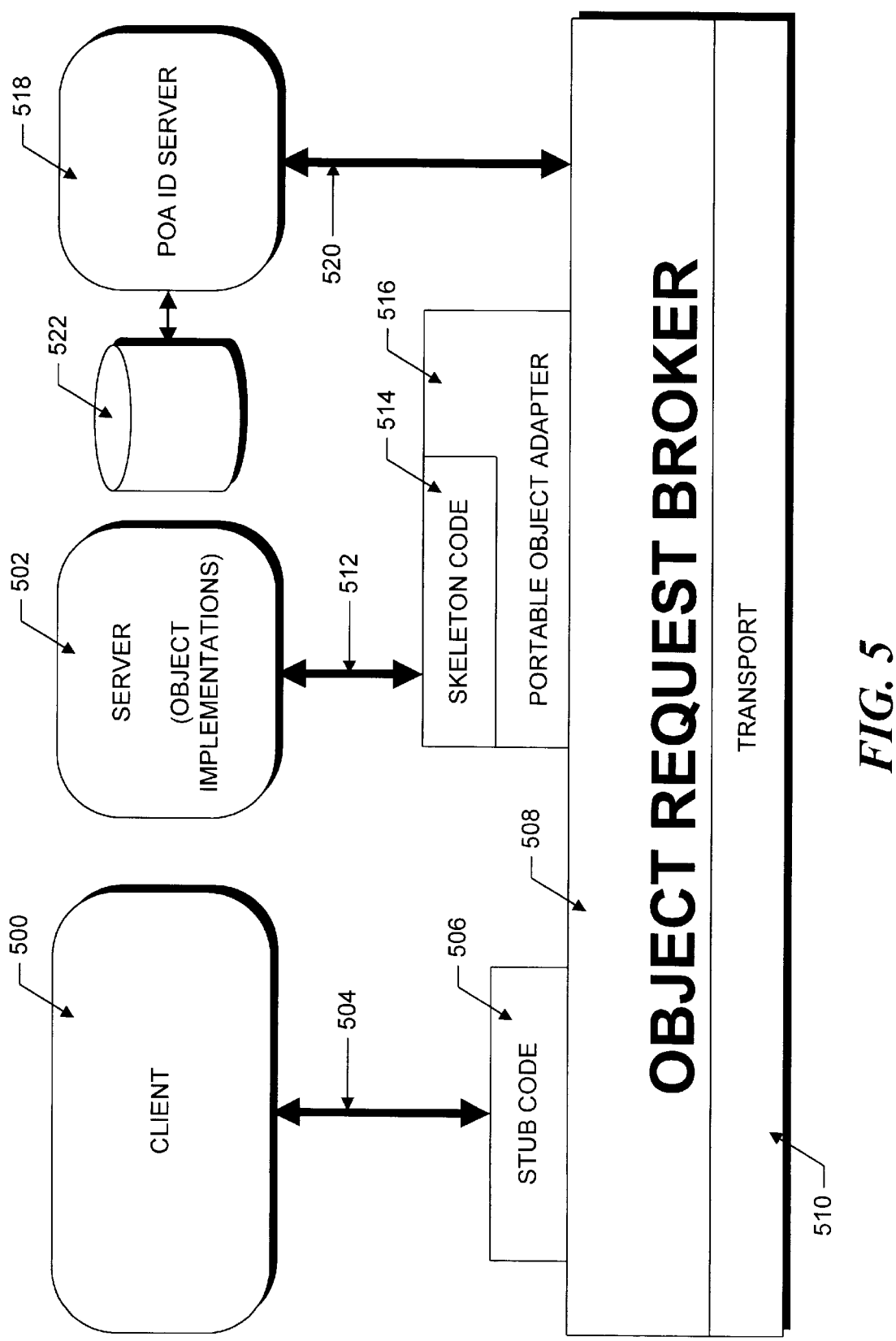
FIG. 5 is a block schematic diagram illustrating a CORBA system employing a POA ID server constructed in accordance with the principles of the present invention.

In accordance with the principles of the invention, a server with persistent state maintains the mapping. This server is illustrated in FIG. 5. Elements in FIG. 5 which correspond to elements in FIG. 3 have been given similar numeral designations. For example, client 300 in FIG. 3 corresponds to client 500 in FIG. 5. the POA ID server 518 is illustrated as interacting with ORB 506 as indicated by arrow 520. The mapping is ultimately written to file 522.

The server 518 is accessed by means of a predefined IDL interface which includes methods for retrieving the mapping. For example, the following interface might be defined. In this interface, minor details irrelevant to the server function have been omitted:

interface ServerDef
{
   typedef sequence<string> Name;
   typedef unsigned long ID;
   ID get_id (in Name the_name);
   Name get_name (in ID the_id);
};

The ServerDef::get_id method accepts, as an argument, the POA name text string and returns the POA ID. If no POA ID exists for a name, the get_id method assigns a new POA ID to the POA name, the_name and returns the new POA ID. Since the server is persistent and has persistent state, it will maintain this mapping as long as the ServerDef object exists. Converting from a POA ID to a POA name is also necessary to support a PortableServer::AdapterActivator mechanism that can be used to dynamically create instances of PortableServer::POA objects in response to incoming requests. This latter conversion is handled by the ServerDef::get_name method, which accepts as an argument, the POA ID and returns the POA name text string and is explained in detail in FIG. 7 below. The get_name and get_id methods are inverses. That is, for any name, get_name(get_id(name))=name, and get_id(get_name (id))=id, if get_name is defined for id.

Conventional administrative CORBA API calls exist for creating and destroying ServerDef objects. These actions correspond to creating and destroying the servers in the ORB. No provision is made for removing a POA Name to POA ID mapping from the ServerDef object, other than destroying the ServerDef object, because the mapping must be persistent, and there is no way that the ORB can tell whether a POA exists or not. Only the server implementation can know this, and this information is not provided to the ORB.

The ServerDef object can implement the persistent mapping between POA names and POA IDs in many ways. For example, the object might maintain a list of (Name, ID) pairs in a file. Then the get_id and get_name methods could be implemented by searching through the collection until the argument to the appropriate method is found, and returning the other element of the pair.

Alternatively, a dictionary can be used to provide efficient access to the data. In such an arrangement, a dictionary can be built on the POA ID, which provides an efficient mapping from POA ID to POA name. Similarly, a dictionary could be used on the POA name, providing an efficient mapping from POA name to POA ID. A combination of dictionary techniques and linear searches can also be used.

Figure 6A:
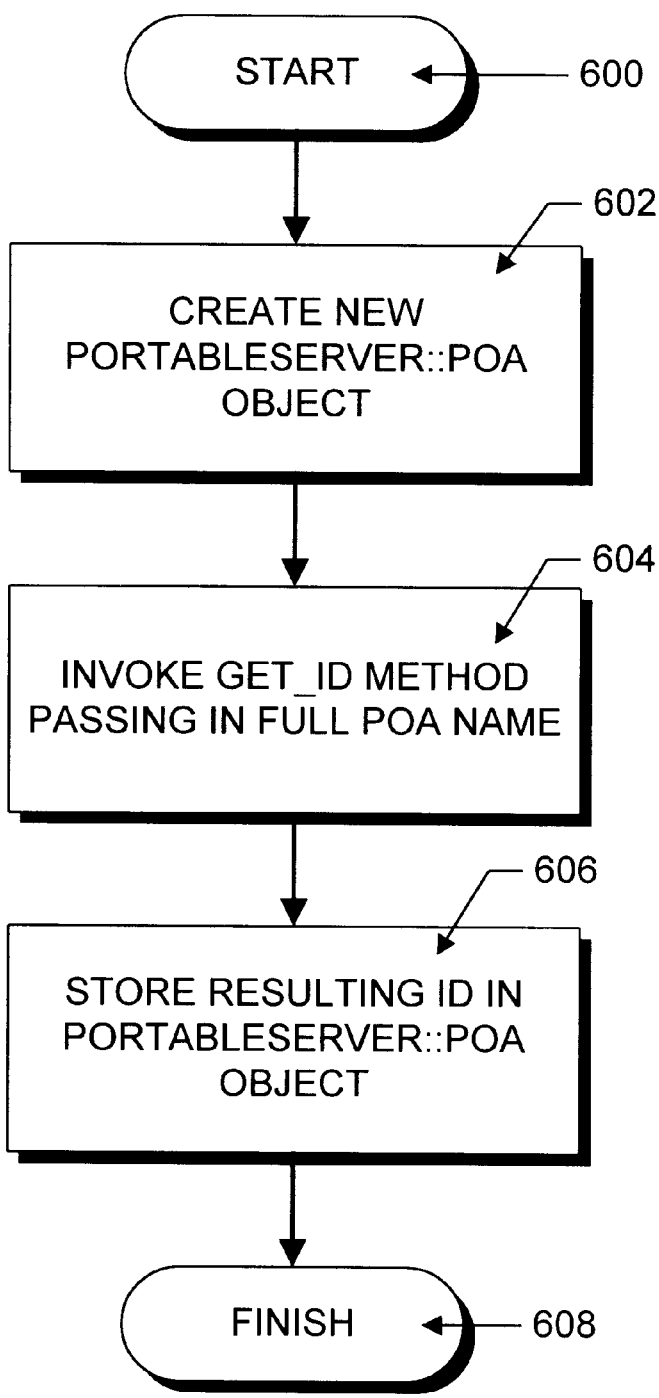
FIGS. 6A and 6B are flowcharts illustrating the creation of a POA and the creation of an object by the POA.
Figure 6B:
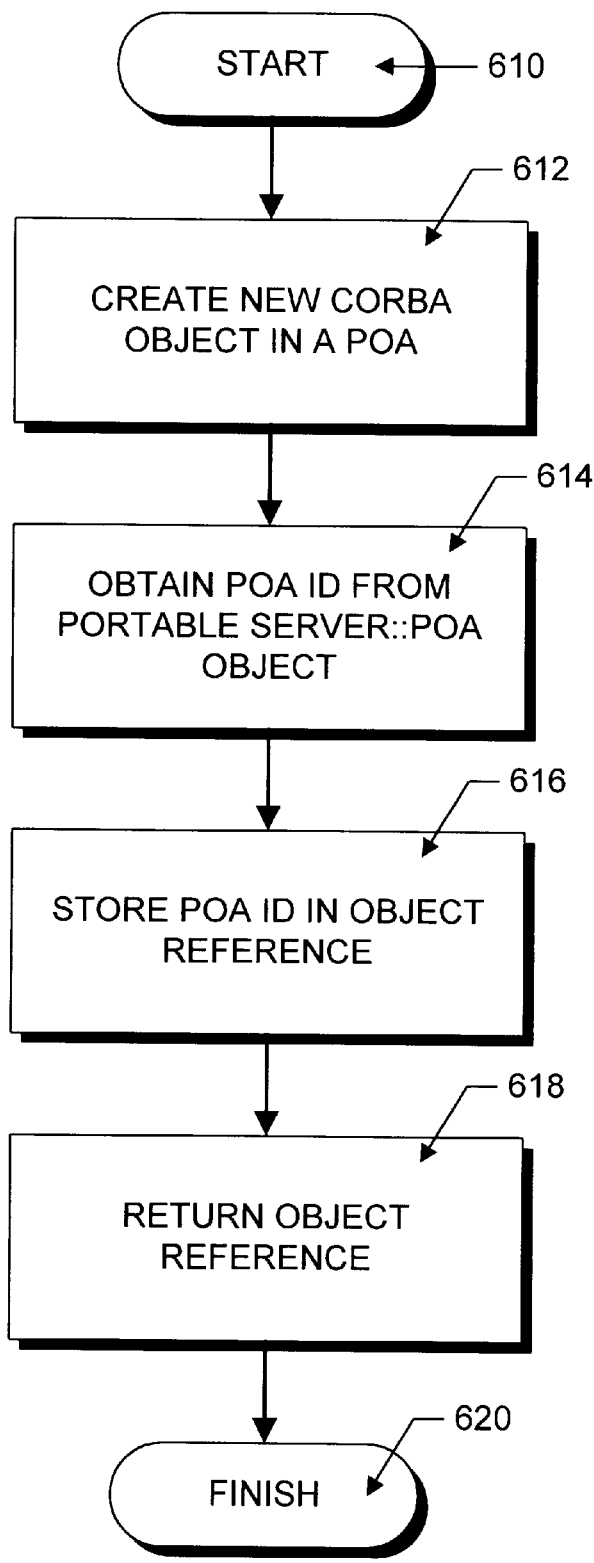

FIGS. 6A and 6B are flowcharts illustrating the use of the POA ID server. When a POA is created as child of an existing POA, it is assigned a POA ID by calling the get_id method on either the transient or the persistent ServerDef, as appropriate. The software routine shown in FIG. 6A begins in step 600 and proceeds to step 602 in which a new PortableServer::POA object is created. This step involves several conventional steps such as setting up internal data structures, but these are not relevant for illustrating the use of the get_id method. Next, in step 604, the get_id method is invoked passing in the full POA name. In step 606, the resulting ID is stored in the PortableServer::POA object. The routine then ends in step 608.

FIG. 6B illustrates the use of the POA to create a CORBA object. Whenever a POA creates an object, the object is labeled with the POA ID as well as other information needed to identify the object. Since the POA can support more than one object, some sort of identifier, generally referred to as an object key, is also required. This routine begins in step 610 and proceeds to step 612 where a new CORBA object is created in a POA. In step 614, the POA ID is obtained from the PortableServer::POA object. In step 616, the POA ID is stored in the object reference. Finally in step 618, the object reference is returned and the routine finishes in step 620. There are additional steps involved in creating an object reference, but are not relevant to this discussion.

Whenever a request is received in the ORB for a POA object, the POA ID in the request is used to determine which POA instance should handle the request. After the request is dispatched to the POA instance, the POA instance will finish invoking the method on the object, which includes any necessary processing related to the object key.

The POA supports dynamic creation of PortableServer::POA objects based on POA names, and the use of a fixed ID, or other compact identifier, affects this dynamic creation mechanism. The get_name method is used to recover the POA name from the POA ID and then the POA name is used to create the POA by using a find_POA method (which is part of the standard POA interface) repeatedly to find the sequence of POAs corresponding to the sequence of names.

In particular, the standard POA interface includes a find_POA method, which has the following IDL signature:

POA find_POA(in string adapter_name, in boolean activate_it)

This method is used to either find an existing POA that is a child of the current POA, or to create a new child POA, if activate_it is TRUE and a child with the given adapter_name does not already exist.

Figure 7A:
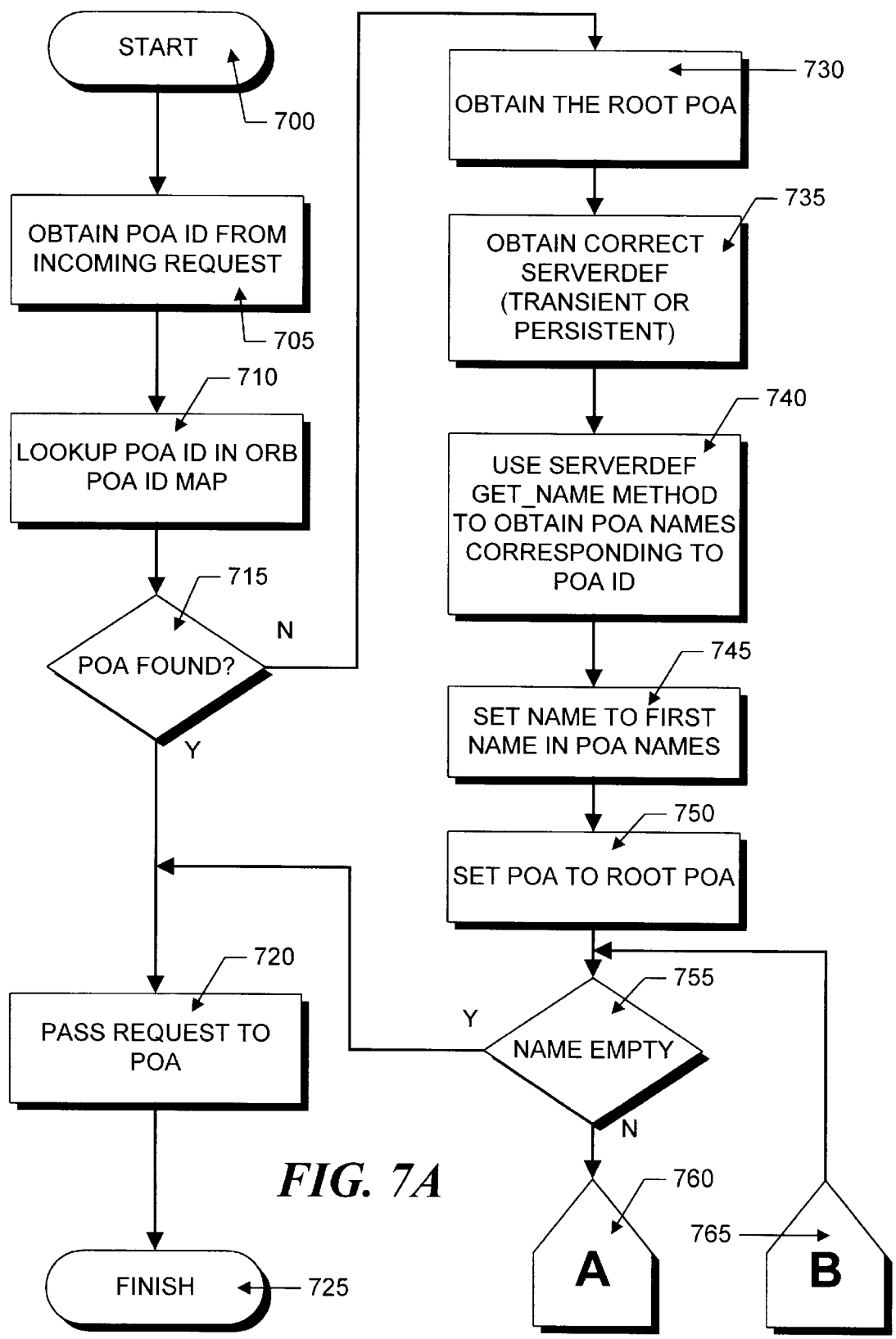
FIGS. 7A and 7B, when placed together, form a flowchart that illustrates the operation of the ServerDef get_name method.
Figure 7B:
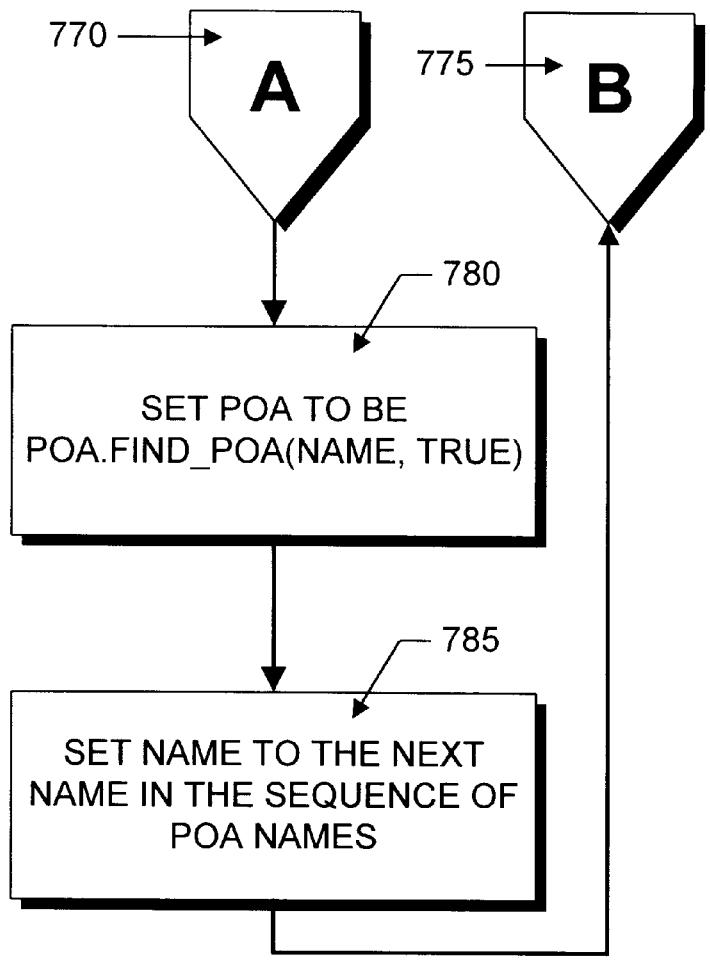

FIGS. 7A and 7B form an illustrative flowchart which illustrates the operation of the ServerDef get_name method. The method begins in step 700 and proceeds to step 705 where the POA ID is obtained from an incoming request. Each incoming request must have the fixed length ID embedded in the request. This can be accomplished by a variety of conventional mechanisms.

Next, in step 710, the POA ID is looked up in an ORB POA ID map. The ORB maintains a lookup table that maps POA IDs into POA object instances. This table is needed so that the ORB can keep track of the state of all the POA instances and dispatch incoming requests. Its implementation is simply a standard table (typically a hash table) that is multi-thread safe.

In step 715, a decision is made whether the POA ID was found in the ORB POA ID map. If so, the method proceeds to step 720 where the request is passed on to the POA which finishes processing in a conventional fashion. The method then finishes in step 725.

Alternatively, if the POA ID is not found in the ORB POA ID map as determined in step 715, then the method proceeds to step 730 where the root POA name is obtained from the ORB. In step 735, the correct ServerDef is obtained. This ServerDef may be either transient or persistent. There are two ServerDefs, a transient one, and a persistent one, although the persistent ServerDef is implemented by the inventive POA ID Server.

(b) In step 740, the illustrative ServerDef get_name method is used to obtain the sequence of POA names corresponding to the POA ID and, in step 745, the name is set to be the first name in the sequence of POA names. In step 750, the POA is set to be the root POA. Steps 755–785 form a lookup loop which is similar to loops used to traverse directories in a file system, except that missing directories are created during traversal of the loop.

In particular, a check is made in step 755 to determine whether the name is empty. If so, the method proceeds to step 720 where the request is passed to the POA. Alternatively, if, in step 755, it is determined that the name is not empty then the method proceeds, via off-page connectors 760 and 770, to step 780 in which the find_POA method is used to either find an existing POA that is a child of the current POA, or to create a new child POA if a child with the non-empty POA name (as determined in step 757) does not already exist.

When such a POA is found or created, the method proceeds to step 785 where the name is set to the next name in the sequence of POA names. The method then returns, via off-page connectors 775 and 765, to step 755 where a decision is made whether the name is empty. From step 755, operation proceeds to either step 720 or to step 780. Operation continues until the method finishes in step 725.

A software implementation of the above-described embodiment may comprise a series of computer instructions either fixed on a tangible medium, such as a computer readable media, e.g. diskette 142, CD-ROM 147, ROM 115, or fixed disk 152 of FIG. 1, or transmittable to a computer system, via a modem or other interface device, such as communications adapter 190 connected to the network 195 over a medium 191. Medium 191 can be either a tangible medium, including but not limited to optical or analog communications lines, or may be implemented with wireless techniques, including but not limited to microwave, infrared or other transmission techniques. It may also be the Internet. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, pre-loaded with a computer system, e.g., on system ROM or fixed disk, or distributed from a server or electronic bulletin board over a network, e.g., the Internet or World Wide Web.

Although an exemplary embodiment of the invention has been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. Further, the methods of the invention may be achieved in either all software implementations, using the

What is claimed is:

1. Apparatus fore efficient representation of variable length object identifiers in a distributed object system having a client and an object server with a method for dynamically crating a portable object adapter, the apparatus compressing:

a database containing a plurality of fixed-length compact object identifiers that are unique only to a particular portable object adapter and variable light object identifiers that are unique throughout the distributed object system;

an ID server having a method responsive to a variable length object identifier for retrieving fixed-length compact object identifiers from the database and returning one of the retrieved fixed-length compact object identifiers which corresponds to the variable length identifier;

an IDL interface available to the object server for invoking the ID server method over the distributed object system; and wherein the method for dynamically creating a portable object adapter invokes the IDL interface when a server object instance does not exist in order to create a server object instance in the portable object adapter using a variable length identifier and assign thereto a previously-assigned fixed-length compact object identifier.

2. Apparatus according to claim 1 wherein the client comprises an object invocation mechanism which uses the one retrieved compact identifier returned from the ID server to identify an object implementation in the object server and to invoke a method in the identified object implementation.

3. Apparatus according to claim 1 wherein the distributed object system has a memory and the database is stored in the memory.

4. Apparatus according to claim 1 wherein the ID server has persistent state.

5. Apparatus according to claim 1 wherein each of the plurality of compact object identifiers comprises a fixed length integer.

6. Apparatus according to claim 1 wherein the database comprises a plurality of variable length object identifier/compact object identifier pairs and wherein the ID server searches the plurality of pairs to locate a given variable length object identifier and returns the corresponding compact object identifier of the pair.

7. Apparatus according to claim 1 wherein the database comprises a plurality of variable length object identifier/compact object identifier pairs and a dictionary built on the variable length object identifiers.

8. Apparatus according to claim 1 wherein the database comprises a plurality of variable length object identifier/compact object identifier pairs and a dictionary built on the compact object identifiers.

9. A method for efficient representation of variable length object identifiers in a distributed object system having a client and an object server with a method for dynamically creating a portable object adapter, the method comprising the steps of:

(a) constructing a database containing a plurality of fixed-length compact object, identifiers that are unique only to a particular portable object adapter and variable length object identifiers that are unique throughout the distributed object system;

(b) constructing an ID server for managing the database, the ID server having a method for retrieving fixed-length compact object identifiers from the database in response to a variable length object identifier and returning one of the retrieved fixed-length compact object identifiers which corresponds to the variable length identifier;

(c) defining an IDL interface available to the object server for invoking the ID server method over the distributed object system; and (d) using the method for dynamically creating a portable object adapter to invoke the IDL interface when a server object instance does not exist in order to createa server object instance in the portable object adapter using a variable length identifier and assigning thereto a previously-assigned fixed-length compact object identifier.

10. A method according to claim 9 wherein the client comprises an object invocation mechanism and the method further comprises the step of:

(d) using the one compact object identifier returned from the ID server to identify an object implementation in the object server and to invoke a method in the identified object implementation.

11. A method according to claim 9 wherein the distributed object system has a memory and step (a) comprises the step of:

(a1) storing the database in the memory.

12. A method according to claim 9 wherein step (b) is performed with an ID server that has persistent state.

13. A method according to claim 9 wherein step (a) comprises the step of:

(a3) constructing a database in which each of the plurality of compact object identifiers comprises a fixed length integer.

14. A method according to claim 9 wherein the database comprises a plurality of variable length object identifier/compact object identifier pairs and wherein step (b) comprises the steps of:

(b1) searching the plurality of pairs to locate a given variable length object identifier; and (b2) returning the corresponding compact object identifier of the pair.

15. A method according to claim 9 wherein the database comprises a plurality of variable length object identifier/compact object identifier pairs and wherein step (a) comprises the step of:

(a4) building a dictionary on the variable length object identifiers.

16. A method according to claim 9 wherein the database comprises a plurality of variable length object identifier/compact object identifier pairs and wherein step (a) comprises the step of:

(a5) building a dictionary on the compact object identifiers.

17. A computer program product for efficient representation of variable object identifiers in a distribution object system having a client and an object server with a method for dynamically creating a portable object adapter, the computer program product comprising a computer usable medium having computer readable program code thereon, including:

program code for constructing a database containing a plurality of fixed-length compact object identifiers that are unique only to a particular portable object adapter and variable length object identifiers that are unique throughout the distributed object system;

program code which constructs an ID server for managing the database, the ID server having a method for retrieving fixed-length compact object identifiers from the database in response to a variable length object identifier and returning one of the retrieved fixed-length compact object identifiers which corresponds to the variable length identifier;

program code for defining an IDL interface available to the object server for invoking the ID server method over the distributed object system; and program code for using the method for dynamically creating a portable object adapter to invoke the IDL interface when aserver object instance does not exit in order create a server object instance in the portable o using a variable length identifier and assigning thereto a previously-assigned fixed-length compact object identifier.

18. A computer program product according to claim 17 wherein the client comprises an object invocation mechanism and the computer program product further comprises program code for using the one retrieved compact object identifier returned from the ID server to identify an object implementation in the object server and to invoke a method in the identified object implementation.

19. A computer program product according to claim 17 wherein the program code for constructing a database comprises program code for constructing a database in which each of the plurality of compact object identifiers comprises a fixed length integer.

20. A computer data signal embodied in a carrier wave for efficient representation of variable length object identifiers in a distributed object system having a client and an object server with a method for dynamically creating a portable object adapter, comprising:

program code for constructing a database containing a plurality of fixed-length compact object identifiers that are unique only to a particular portable object adapter and variable length object identifiers that are unique throughout the distributed object system;

program code which constructed an ID server for managing the database, the ID server having a method for retrieve fixed-length compact object identifiers from the database in response to variable length object identifier and returning one of the retrieved fixed-length compact object identifiers which corresponds to the variable length identifier;

program code for defining an IDL interface available to the object server for invoking the ID server method over the distributed object system; and program code for using the method for dynamically creating a portable object adapter to invoke the IDL interface when a server object instance does not exist in order to create a server object instance in the portable object adapter using a variable length identifier and assigning thereto a previously-assigned fixed-length compact object identifier.

21. The computer data signal as defined in claim 20 wherein the client comprises an object invocation mechanism and the data signal further comprises program code for using the one retrieved compact object identifier returned from the ID server to identify an object implementation in the object server and to invoke a method in the identified object implementation.

* * * * *